United States Patent

Topcik

[15] 3,687,893
[45] Aug. 29, 1972

[54] RUBBER COMPOUNDING
[72] Inventor: Barry Topcik, Somerville, N.J.
[73] Assignee: Columbian Carbon Company, New York, N.Y.
[22] Filed: Sept. 23, 1970
[21] Appl. No.: 74,863

Related U.S. Application Data

[63] Continuation of Ser. No. 738,417, June 20, 1968, abandoned, which is a continuation-in-part of Ser. No. 468,151, June 29, 1965, abandoned.

[52] U.S. Cl. ............................................. 260/41.5
[51] Int. Cl. ............................................ C08f 45/08
[58] Field of Search ................................. 260/41.5

[56] References Cited

UNITED STATES PATENTS 3,331,793  7/1967  Souffie .......................... 260/4
3,140,192  7/1964  Jordan et al. ............... 106/307
2,118,601  5/1938  Gerke et al. ................. 106/23

Primary Examiner—Morris Liebman
Assistant Examiner—J. H. Derrington
Attorney—J. Richard Geaman

[57] ABSTRACT

A process whereby a sulfur-curable ethylene-propylene terpolymer is heat treated with a carbon black having a halogen chemisorbed thereon to yield, on subsequent vulcanization, a vulcanizate having increased tensile and rebound, reduced hysteretic properties, and improved tear strength and electrical resistivity. After compounding the ethylene-propylene terpolymer and the halogenated black, heat treatment may be carried out with simultaneous mastication in a heated Banbury or on a heated roll mill, or alternatively the masterbatch may be heated without mastication, e.g., in a rubber press. The heat treatment is carried out in the absence of curatives.

6 Claims, No Drawings

RUBBER COMPOUNDING

CROSS REFERENCES

This is a continuation of copending application Ser. No. 738,417 filed June 20, 1968 now abandoned which is a continuation-in-part of co-pending application Ser. No. 468,151 filed June 29, 1965 now abandoned, entitled "Rubber Compounding" and is assigned to the same assignee.

BACKGROUND OF THE INVENTION

This invention relates to the compounding of rubber and more particularly to a method for improving the properties of sulfur-curable rubbery ethylene-propylene terpolymers, as well as to improved vulcanizates obtained thereby.

It is known to prepare sulfur-curable rubbery ethylene-propylene terpolymers, herein sometimes referred to for simplicity as ethylene-propylene rubbers, by copolymerizing ethylene, propylene and a monomer containing more than one ethylenic double bond, e.g., 1,4-hexadiene; dicyclopentadiene; unsaturated deriva-tives of bicyclo-(2,2,1)-heptane, including norbornene and bicyclopentadiene; unsaturated derivatives of bicyclo-(3,2,1)-octane; unsaturated derivatives of bicyclo-(3,3,1)-nonane; unsaturated derivatives of bicyclo-(3,2,2)-nonane; 1,5cyclooctadiene 1,4,9-decatriene;etc., in the presence of a coordination catalyst such as that formed by mixing a reducing compound with certain compounds of transition metals. Generally, these rubbery polymers contain about 20 to about 80 mole percent of ethylene, about 10 to about 60 mole percent of propylene and from about 0.1 to about 20 mole percent of a third monomer. Ethylene-propylene rubbers of this type are described for example in U.S. Pat. Nos. 2,933,480; 3,000,866; 3,063,973; 3,093,620 and 3,093,621 and British patent 880,904.

As would be expected from its amorphous nature, the mechanical strength of sulfur-cured ethylene-propylene rubber is negligible without reinforcement. Although conventional reinforcing fillers such as carbon black greatly improve the mechanical strength of ethylene-propylene rubber, it would be desirable to obtain further improvements in this direction. The resistance of ethylene-propylene rubber to tearing is a property in which improvement would be particularly desirable.

SUMMARY OF THE INVENTION

In accordance with the present invention, the mechanical properties of ethylene-propylene rubber are greatly improved by subjecting a mixture of the rubber and a modified carbon black to a thermal treatment, as will hereinafter be more fully described. The resultant composition, when further compounded and vulcanized with sulfur, generally displays higher tensile strength and rebound characteristics, and lower heat buildup compared to vulcanized ethylene-propylene rubber compositions formulated with conventional carbon blacks in accordance with conventional compounding procedures. The tear strength and electrical resistivity properties possessed by the compositions of the invention are particularly outstanding, indicating that a high degree of bonding between the modified carbon black particles and the ethylene-propylene rubber molecules is probably obtained. Thus, due presumably to enhanced carbon-to-rubber bonding, the compositions provided by the invention have a high resistance to tearing when subjected to a shearing stress at a fixed rate, such as is exerted by the trousers tear test. Further evidence that there is increased carbon-polymer association from heat treating mixtures of the modified carbon and ethylene-propylene rubber is manifested by an increase in the Mooney viscosity of this mixture compared to a mix containing untreated carbon.

The tear resistance, tensile strength, rebound, heat build-up and other characteristics possessed by the ethylene-propylene rubber compositions obtained by the process of this invention are especially desirable in pneumatic tires, particularly in the tread thereof, since such characteristics provide increased abrasion resistance as well as an increased resistance to chunking and chipping. However, the compositions may also be utilized in the manufacture of mechanical goods, such as conveyor belts, chute lining, hose, and the like, wherein excellent tear strength, tensile strength, etc. are required.

The modified carbon blacks contemplated by the present invention contain a halogen, i.e., fluorine, chlorine, bromine, and iodine, chemisorbed thereon. The term "chemisorbed" is used herein since the condition of the halogen on the carbon black is not known with certainty. Thus the halogen may be adsorbed, absorbed, chemically bonded to the carbon black, or any combination of the three. From a commercial standpoint, the bromine- and chlorine- containing blacks are preferred. Such halogen-containing blacks may be prepared by treating any conventional carbon black, including thermal black, channel black and furnace black, with a halogenating substance, but it is preferrable to treat conventional rubber grades of furnace blacks and channel blacks because of the high degree of reinforcement imparted by these blacks to ethylene-propylene rubber.

The treatment of carbon black with a halogenating substance may be carried out by a number of suitable methods. One suitable treatment procedure comprises intimately contacting carbon black with a gaseous halogen at a temperature of from about 0°C to about 250°C or more, for 5 minutes to about 5 hours or more. For instance, the carbon black may be contacted with the gaseous halogen at room temperature for about 2 hours.

The halogen-containing carbon blacks used in the practice of the invention advantageously contain at least about 0.5 percent halogen by weight. When the halogen-containing black is prepared by contacting carbon black with gaseous halogen according to the treatment procedure just noted, the halogen content of the black is generally within the range of from about 0.5 percent to about 15 percent, or more, by weight.

Improvements in the mechanical strength of the ethylene-propylene rubber may be obtained using as little as 40 parts of the halogen-containing carbon black per 100 parts by weight of ethylene-propylene rubber, although in most instances, optimum results are obtained using from about 50 to about 125 phr (parts per 100 parts of rubber). If desired, the halogen-containing black may be employed in an amount ranging as high as about 250 phr.

It has been found that the improvements afforded by the present invention are not achieved by merely "cold mixing" the halogen-containing carbon black and the ethylene-propylene rubber. Thus, the response of ethylene-propylene rubber to halogen-containing carbon black upon milling on a cold rubber mill or in a Banbury mixer at low temperatures, is substantially the same as the response to conventional carbon blacks. Only when the mixture of ethylene-propylene rubber and halogen-containing carbon black is subjected to a thermal treatment may the unexpected benefits of the invention be realized.

The heat-treatment contemplated by the invention is carried out after the compounding of the ethylene-propylene rubber and the halogen-containing carbon black. The heat-treatment may, for example, be carried out by subjecting the ethylene-propylene rubber having the halogen-containing carbon black incorporated therein to simultaneous mastication and heating by means of a Banbury mixer or a hot roll mill. Alternatively, the compositions may be exposed to heating, e.g., live steam, without simultaneous mastication.

The temperature and time conditions at which the heat-treatment is carried out are subject to wide variation. Generally speaking, useful results are obtained by heating the composition at a temperature of from about 250°F to about 450°F for an inversely extended period of time of from about one minute to about five hours, or longer, although from a commercial standpoint, it is preferred to carry out the heat-treatment in a Banbury mixer or on a roll mill at a temperature of from about 300°F to about 400°F for an inversely extended period of time of from about 2 minutes to about 15 minutes. In accordance with one suitable procedure, the ethylene-propylene rubber and halogen-containing carbon black are subjected to mastication on a roll mill to form a homogeneous mixture, after which mixing is continued on the roll mill at the temperature and time conditions noted above to accomplish the heat-treatment.

In accordance with a preferred aspect of the present invention, the heat-treatment is carried out in the absence of significant quantities of extender oils. It has been found that when significant amounts, i.e., greater than about 5 parts per 100 parts by weight of rubber, of extender oils are present during heat treatment, the properties of ethylene-propylene rubber, particularly the tear strength and electrical resistivity properties thereof, are not significantly enhanced. The heat-treatment should, of course, also be carried out in the absence of curing amounts of sulfur.

If desired, the heat-treatment may be carried out in the presence of chemical promoting agents such as have been heretofore used to promote the thermal interaction of carbon black and butyl rubber. Such chemical promoters are, for example, para-dinitrosobenzene, para-benzoquinone dioxime, para-nitrosophenol, N,4-dinitroso-N-methylaniline and non-curing amounts of sulfur and sulfur-containing compounds, e.g., tetramethylthiuramdisulfide. However, no apparent advantages are obtained by including a chemical promoter in the ethylene-propylene rubber-carbon black composition subjected to heat-treatment, and in fact, such practice sometimes results in the development of below-optimum properties. For example, when a chemical promoter is present during heat-treatment, the tear strength of the composition is not enhanced to as great a degree as when the promoter is excluded.

If desired, a conventional carbon black may be added to the composition either during or after the heat-treatment step. The total amount of carbon black in the composition, including any conventional carbon black which may be employed in conjunction with the halogen-containing carbon black, should not exceed about 250 phr.

Following heat-treatment, the compositions may be further compounded with antioxidants, accelerators, activators, plasticizers, sulfur curatives and the like, according to the desires of the formulator. The resultant vulcanizable compound may then be fabricated to the desired form by the usual molding, extruding or calendering operations, and subsequently vulcanized in a conventional manner.

The outstanding tear strength, electrical resistivity, tensile, rebound, and other desirable properties possessed by the compositions of the present invention are particularly surprising in view of my findings that heat-treatment of ethylene-propylene rubber containing conventional carbon black does not greatly enhance these properties, and in some instances actually deleteriously affects them. Thus, I have found that heat-treatment of a conventional carbon black, such as high abrasion furnace black (HAF), with ethylene-propylene rubber does not significantly enhance the tear strength and electrical resistivity properties compared to a conventionally mixed HAF black-ethylene-propylene rubber composition. Furthermore, when a promoter is present during heat-treatment of a conventional carbon black with ethylene-propylene rubber compound, the compositions when cured generally possess markedly lower tear strength.

The outstanding tear strength and electrical resistivity properties of the present compositions suggest that a high degree of carbon-to-rubber bonding has been achieved. Although I do not wish to limit the invention thereto, it is my present belief that the halogen-containing black, under the conditions of heat-treatment, liberates free radicals which in some way promote an interaction between the carbon black particles and the ethylene-propylene rubber molecules.

My invention and the advantages thereof will now be further described by the following specific illustrations.

EXAMPLE 1

In this illustration a sulfur-curable ethylene-propylene rubber containing about 63 mole percent ethylene, about 33 mole percent propylene and about 4 mole percent 1,4-hexadiene, and having a Mooney viscosity (ML-4 at 212°F) of about 87 and an iodine number of 12.8 was compounded according to the following recipe, in which all amounts are expressed in parts by weight:

TABLE I

| Recipe: | Composition | | | | |
| --- | --- | --- | --- | --- | --- |
| | A | B | C | D | E |
| Ethylene-propylene Rubber | 100 | 100 | 100 | 100 | 100 |
| High Abrasion Furnace Black | 72 | 72 | — | 72 | — |

|  |  |  |  |  |  |
|---|---|---|---|---|---|
| Bromine-containing HAF Black | — | — | 72 | — | 72 |
| Naphthenic Oil | 45 | 45 | 45 | 45 | 45 |
| Zinc Oxide | 5 | 5 | 5 | 5 | 5 |
| Stearic Acid | 1 | 1 | 1 | 1 | 1 |
| Mercaptobenzothiazole | 0.5 | 0.5 | 0.5 | 0.5 | 0.5 |
| Tetramethylthiuramdisulfide | 1.5 | 1.5 | 1.5 | 1.5 | 1.5 |
| Sulfur | 1.5 | 1.5 | 1.5 | 1.5 | 1.5 |

The carbon black employed in each of compositions A, B and D was an untreated conventional high abrasion furnace black (HAF). The bromine-containing black employed in compositions C and E was prepared by intimately contacting the same HAF black with 6 percent by weight gaseous bromine at room temperature for about two hours in a rotating treating chamber. Following treatment, the black was heated in an oven at 350°F for 2 hours to drive off excess bromine. Upon analysis by the following procedure, the black was found to contain about 3.5 percent by weight of bromine.

PROCEDURE FOR DETERMINING PERCENT HALOGEN

1. One g. of the carbon (which has been vacuum dried at 100°F for 17 hours) is weighed to the nearest 0.1 mg. into a previously weighed platinum crucible.

2. 3.0 g. of Eschka's Mixture are added to the crucible and intimately mixed with the sample. The mixture is then covered with 2.0 g. more of Eschka's Mixture and placed in a muffle furnace at room temperature.

3. The muffle furnace temperature is allowed to rise from room temperature to 800°C in approximately 1 hour. After reaching 800°C the muffle furnace is maintained at this temperature for an additional 1-½ hours. A current of air is passed continuously through the muffle furnace during the analysis to insure complete incineration of the sample.

4. After the incineration of the sample is complete, the contents of the crucible are quantitatively washed into a 250 ml. Pyrex beaker using boiling hot distilled water. After the transfer is complete, the walls of the beaker are washed with boiling distilled water. The total volume of distilled water for the transfer and washing should not exceed 75 ml.

5. The beaker is covered with a watch glass and the contents of the beaker are boiled gently for one-half hour with occasional stirring to counteract the tendency of the Eschka's Mixture to clump together during boiling.

6. After the half-hour boiling, the supernatant liquid in the beaker if filtered through Whatman No. 1 filter paper into a 250 ml. volumetric flask.

7. 50 ml. more of boiling distilled water is added to the remaining solid in the beaker and the beaker is again covered with a watch glass, boiled for 20 minutes with occasional stirring and the supernatant liquid is again filtered into the 250 ml. volumetric flask containing the original filtrate.

8. 50 ml. more of boiling distilled water is added to the remaining solids in the beaker and after a 20 minute boiling the contents of the beaker including the solids are quantitatively washed into the filter paper using boiling distilled water, and filtered into the 250 ml. volumetric flask containing the washings from the two previous extractions.

9. After transfer, the solids in the filter paper are washed with a small portion of boiling distilled water. Care should be exercised during the final transfer and washing to see that the total volume of the filtered liquid does not exceed the 250 ml. capacity of the flask.

10. The contents of the flask are cooled to room temperature and diluted to the 250 ml. mark with distilled water. The flask is then stoppered and well shaken to insure complete mixing of its contents.

11. 2 ml. aliquots are pipetted from the 250 ml. volumetric flask into 25 ml. Erlenmeyer flasks. Two drops of 1 percent methanolic phenolphythalein indicator are added to the flask and 1 to 2 N nitric acid is added drop by drop with swirling of the solution after each drop until the pink color disappears (usually no more than 1 or 2 drops of acid are needed).

12. After the solution is colorless two drops of 1 percent potassium chromate indicator are added and the solution is titrated drop by drop with standard 0.02 N silver nitrate solution until an orange color is obtained in the solution which persists on swirling.

13. A blank consisting of 5.0 g. of Eschka's Mixture is run along with the sample and treated in exactly the same manner.

14. Percent bromine is determined by the following calculations:

Bromine found (mg.) = (ml. of AgNO$_3$ for sample — ml. of AgNO$_3$ for blank) × N of AgNO$_3$ × 50 × milliequivalent weight of bromine $$\text{Percent bromine} = \frac{\text{bromine found (mg.)}}{\text{wt. of sample (mg.)}} \times 100$$

Referring to Table 1, above, composition A was prepared by mixing all of the ingredients on a roll mill in accordance with conventional compounding techniques. Compositions B through E were prepared by subjecting a previously prepared masterbatch to heat-treatment at 300°F for 7 minutes on a roll mill, followed by further compounding with the remaining ingredients of the recipe on a cold two-roll mill. More specifically, in the preparation of compositions B and C a previously prepared masterbatch consisting solely of carbon black and ethylene-propylene rubber was subjected to heat treatment. In the preparation of compositions D and E, the masterbatches included a predominantly unsaturated naphthenic extender oil in addition to carbon black and ethylene-propylene rubber. The physical properties of the rubber compositions, cured at 307°F, were found to be as follows:

TABLE 2

| Physical Properties | A | Composition B | C | D | E |
|---|---|---|---|---|---|
| 10' Modulus (psi) L-300 | 590 | 590 | 450 | 450 | 280 |
| 10' Tensile Strength (psi) | 2680 | 2690 | 2390 | 2560 | 2100 |
| 60' L-300 | 1630 | 1800 | 1780 | 1230 | 920 |
| 60' Tensile Strength | 2770 | 2780 | 3190 | 2610 | 2970 |
| 60' Elongation (%) | 405 | 410 | 425 | 515 | 645 |
| 60' Shore Hardness | 55 | 57 | 53 | 56 | 56 |
| 90' Tensile Strength | 2770 | 2780 | 3060 | 2640 | 2970 |
| Maximum Tensile | 2870 | 2800 | 3250 | 2770 | 2970 |
| Log R | 3.2 | 3.6 | 9.5 | 3.0 | 3.5 |
| Rebound (%) | 65 | 66 | 71 | 60.3 | 63.1 |
| Goodrich Flex (ΔT) | 73 | 73 | 65 | 74 | 74 |
| Mooney Visc. (ML–4' at 212°F) | 58 | 58.5 | 67 | 58 | 62 |
| Trousers Tear at R. T. | 60–180 | 35–227 | 214–610 | 30–218 | 61–205 |
| Avg. of 3 breaks | 115 | 119 | 424 | 110 | 116 |

Referring to compositions A, B, and C, it will be noted that heat-treatment of conventional high abrasion furnace black with ethylene-propylene rubber (composition B) did not result in significantly better physical properties compared to composition A, which was mixed in accordance with conventional procedures. However, heat-treatment of bromine-containing carbon black with ethylene-propylene rubber (composition C) resulted in increased tensile strength, log R (electrical resistivity), rebound, Mooney viscosity, and tear strength, and lower heat build-up compared to both compositions A and B. The outstanding tear strength, log R and other properties of composition C indicate that improved carbon-to-rubber bonding has been achieved by heat-treating bromine-containing black with ethylene-propylene rubber.

A comparison of the properties of composition C with that of composition E indicates that the presence of significant quantities of extender oil during the heat-treatment of bromine-containing black and ethylene-propylene rubber inhibits the development of outstanding tear strength and electrical resistivity properties. However, the presence of naphthenic oil during the heat-treatment of conventional HAF black and ethylene-propylene rubber does not significantly affect these properties, as will be noted from a comparison of compositions B and D.

EXAMPLE 2

In this illustration, the sulfur-curable ethylene-propylene rubber defined in Example 1 was compounded according to the following recipe, in which all amounts are in parts by weight:

TABLE 3

| Recipe: | F | Compositions G H | I J | K |
|---|---|---|---|---|
| Ethylene-propylene Rubber | 100 | 100 100 | 100 100 | 100 |
| Bromine-containing high structure HAF black | — | — — | 72 72 | 72 |
| Untreated high structure HAF black | 72 | 72 72 | — — | — |
| Naphthenic oil | 45 | 45 45 | 45 45 | 45 |
| Zinc Oxide | 5 | 5 5 | 5 5 | 5 |
| Stearic Acid | 1 | 1 1 | 1 1 | 1 |
| Mercaptobenzothiazole | 0.5 | 0.5 0.5 | 0.5 0.5 | 0.5 |
| Tetramethylthiuramdisulfide | 1.5 | 1.5 1.5 | 1.5 1.5 | 1.5 |
| p-Benzoquinone dioxime | — | — 0.25 | — — | 0.25 |
| Sulfur | 1.5 | 1.5 1.5 | 1.5 1.5 | |

The bromine-containing blacks employed in compositions I, J and K were prepared by treating a high structure furnace black in the HAF fineness range with 5 percent by weight gaseous bromine at room temperature for about 2 hours in a rotating treating chamber. Following treatment, the black was heated in an oven at 300°F for 3 hours to drive off excess bromine. Upon analysis by the following procedure, the black was found to contain 3.0 percent by weight of bromine.

Compositions F and I were prepared in accordance with conventional compounding techniques by mixing all of the ingredients on a two-roll mill, while compositions G, H, J, and K were prepared by subjecting a previously prepared masterbatch to heat-treatment on a roll mill at 300°F for 10 minutes, followed by further compounding with the remaining ingredients of the recipes on a cold two-roll mill. Thus, compositions G and J were prepared by heat-treating a masterbatch consisting solely of carbon black and ethylene-propylene rubber, while in the case of compositions H and K, para-benzoquinone dioxime was included as a promoter in the black-rubber masterbatch subjected to heat-treatment.

The physical properties of the vulcanizates cured at 307°F were as follows:

TABLE 4

| Physical Properties | F | G | H | Composition I | J | K |
|---|---|---|---|---|---|---|
| 10' Modulus (psi) L-300 | 400 | 690 | 500 | 240 | 500 | 500 |
| 10' tensile strength (psi) | 2010 | 2640 | 2240 | 1420 | 2280 | 2290 |
| 60' L-300 | 1360 | 1340 | 2010 | 900 | 1830 | 1910 |
| 60' tensile strength | 2640 | 2870 | 2860 | 2440 | 3150 | 3080 |
| 60' Elongation (%) | 530 | 510 | 395 | 660 | 425 | 410 |
| 60' Shore Hardness | 58 | 58 | 59 | 57 | 53 | 53 |
| 90' Tensile | 2640 | 2860 | 2770 | 2570 | 3140 | 3010 |
| Maximum Tensile | 2640 | 2920 | 2870 | 2570 | 3150 | 3080 |
| Log R | 3.2 | 3.9 | 3.2 | 3.4 | 10.5 | 10.5 |
| Rebound (%) | 65.4 | 65.4 | 66 | 65.7 | 72.6 | 72.4 |
| Goodrich Flex (ΔT) | 71 | 71 | 71 | 71 | 61 | 61 |
| Mooney Visc.(ML-4' at 202°F) | 60 | 61 | 61 | 65 | 68.5 | 68.5 |
| Trousers Tear | 27–39 | 33–38 | 25–32 | 33–41 | 205–262 | 118–237 |
| avg. of three breaks | 35 | 35 | 28 | 36 | 220 | 165 |

It will be apparent from a comparison of compositions F, G and H that heat-treatment of conventional high structure HAF black with ethylene-propylene rubber, in either the presence or absence of a chemical promoter, did not significantly enhance the tear strength and electrical resistivity properties of the cured stocks relative to the conventionally mixed control, composition F. Indeed, when a promoter was included in the masterbatch subjected to heat-treatment (composition H), the trousers tear strength was below that of the control.

It will also be noted that the compounding of ethylene-propylene rubber with bromine-containing black without subsequent heat-treatment (composition I) resulted in properties substantially the same as those of compositions F, G and H. Thus, in the absence of heat-treatment, the bromine-containing carbon black functioned more or less like its untreated parent in reinforcing ethylene-propylene rubber. However, when the bromine-containing carbon black-ethylene-propylene rubber mixture was subjected to a heat-treatment, tensile strength, rebound, log R, Mooney viscosity and tear strength properties were substantially enhanced while heat build-up was decreased. It should be noted in particular that trousers tear strength was increased by a factor of at least 2-½ to 3, while log R was increased by a factor of at least 6 compared to compositions F, G, H and I, indicating that the compounding of ethylene-propylene rubber with bromine-containing carbon black followed by heat-treatment of the composition results in improved carbon-to rubber bonding.

As will be noted from composition K, the inclusion of chemical promoter in the bromine-containing carbon black-ethylene-propylene rubber composition subjected to heat-treatment results in rubber properties essentially the same as those of composition J with the exception that trousers tear strength is somewhat lowered.

The carbon blacks employed in the present invention may contain halogens other than bromine. The following Example illustrates the use of a chlorine-containing carbon black.

EXAMPLE 3

A high structure HAF block was intimately contacted with 6 percent by weight gaseous chlorine for two hours at room temperature. Following oven heating to drive off excess chlorine, the black was found to contain about 2.7 percent chlorine, by weight. The resultant black was mixed with ethylene-propylene rubber on a two roll mill in the amount noted in Table 5 below to form a homogeneous mixture. Mixing was then continued on the mill for an additional 5 minutes at 325°F to accomplish the desired heat-treatment.

The heat-treated composition was then compounded on a cold mill with the remaining ingredients indicated in the recipe set forth in Table 5, and the fully compounded composition was cured at 307°F for 60 minutes to give the following properties:

TABLE 5

| Recipe: | Composition L |
| --- | --- |
| Ethylene-propylene rubber | 100 |
| Chlorine-containing high structure HAF black | 72 |
| Napthenic Oil | 45 |
| Zinc Oxide | 5 |
| Stearic Acid | 1 |
| Mercaptobenzothiazole | 0.5 |
| Tetramethylthiuramdisulfide | 1.5 |
| Sulfur | 1.5 |
| Properties (60' at 307°F) | |
| Modulus (psi) L-300 | 1750 |
| Tensile Strength (psi) | 3040 |
| Elongation (%) | 425 |
| Shore Hardness | 55 |
| Log R | 9.6 |
| Trousers Tear at R.T. | 210–293 |
| Avg. of 3 breaks | 267 |

The above data show that heat-treatment of chlorine-containing carbon black and ethylene-propylene rubber developed outstanding tear strength, electrical resistivity and other properties.

While the invention has been described above with respect to certain preferred embodiments thereof, it will be understood by those in the art that various changes and modifications may be made without departing from the spirit and scope of the invention as expressed in the appended claims.

Therefore, I claim:

1. In the process of producing a vulcanizate comprising (1) a terpolymer of ethylene, propylene and a third monomer containing more than one ethylenic double bond and (2) carbon black, the method for improving the tear strength, the electrical resistivity, and the tensile strength of the vulcanizate which comprises the steps of:
   a. homogenuously mixing said terpolymer with a carbon black containing about 0.5 percent to about 15 percent by weight of halogen chemisorbed thereon, the ratio of said carbon black to said terpolymer being about 40 to about 250 parts carbon black per 100 parts terpolymer by weight;
   b. heating the resulting mixture at about 250°F. to about 450°F. for an inversally extended period of time of from about one minute to about five hours in the absence of
      1. curing amounts of sulfur,
      2. significant amounts of extender oils, and
      3. significant amounts of a chemical promoter, the resulting heat-treated mixture being characterized by higher Mooney viscosity (ML-4 at 212°F.) compared to that developed with the same carbon black in unhalogenated form; and
   c. curing the heat reacted mixture with sulfur.

2. The method of claim 1 in which said mixture is simultaneously masticated and heated.

3. The method of claim 1 in which said halogen-containing carbon black is derived from a furnace black.

4. The method of claim 1 in which said halogen-containing carbon black is selected from the group consisting of chlorine-containing carbon blacks and bromine-containing carbon blacks.

5. The method of claim 1 in which the halogen-containing carbon black is employed in the amount of from about 50 to about 125 parts per 100 parts of said terpolymer by weight.

6. The method of claim 5 in which the homogeneous mixture of ethylene-propylene rubber and halogen-containing carbon black is heated at about 300°F to about 400°F for an inversely extended period of time of from about 2 minutes to about 15 minutes.

* * * * *

PO-1050
(5/69)

UNITED STATES PATENT OFFICE
CERTIFICATE OF CORRECTION

Patent No. 3,687,893          Dated  August 29, 1972

Inventor(s)  Barry Topcik

It is certified that error appears in the above-identified patent and that said Letters Patent are hereby corrected as shown below:

ASSIGNEE:    Delete "Columbian Carbon Company"

Insert -- CITIES SERVICE COMPANY --.

Signed and sealed this 3rd day of April 1973.

(SEAL)
Attest:

EDWARD M. FLETCHER, JR.                        ROBERT GOTTSCHALK
Attesting Officer                                   Commissioner of Patents